United States Patent [19]

Krokaugger

[11] Patent Number: 4,628,230

[45] Date of Patent: Dec. 9, 1986

[54] REGULATED LIGHT DIMMER CONTROL

[75] Inventor: William G. Krokaugger, Chatsworth, Calif.

[73] Assignee: Mole-Richardson Company, Hollywood, Calif.

[21] Appl. No.: 762,716

[22] Filed: Aug. 5, 1985

[51] Int. Cl.[4] .............................................. H02B 37/02

[52] U.S. Cl. .................................... 315/307; 315/194; 315/199; 315/291; 315/DIG. 4

[58] Field of Search ................. 315/194, 199, DIG. 4, 315/291, 307

[56] References Cited

U.S. PATENT DOCUMENTS

| | | | |
|---|---|---|---|
| 3,684,919 | 8/1972 | Cramer | 315/DIG. 4 |
| 3,845,350 | 10/1974 | Luursema | 315/307 |
| 4,001,637 | 1/1977 | Gray | 315/194 |
| 4,219,761 | 8/1980 | Mustoe | 315/194 |
| 4,300,075 | 11/1981 | Foose et al. | 315/307 |
| 4,395,660 | 7/1983 | Waszkiewicz | 315/DIG. 4 |

OTHER PUBLICATIONS

"SCR Manual" Fifth Edition p. 252 (1972).

*Primary Examiner*—Harold Dixon
*Attorney, Agent, or Firm*—Edward A. Sokolski

[57] ABSTRACT

A regulated light dimmer control circuit which is particularly suitable for use in controlling the level of illumination of lights in a sound stage environment such as a motion picture set television studio or sound studio. A variable D.C. voltage source is utilized as the dimmer control usually located within the studio and manually controlled by an operator. The D.C. output of the dimmer control is fed to a voltage regulator and controller which receives an output from a timing circuit having a periodic waveform output which is synchronized with the A.C. power line and provides a trigger signal for a solid state relay when the D.C. fed from the dimmer control to the voltage controller is equal to or greater than the output of the timing circuit. Thus, the solid state relay will be fired for a portion of the A.C. period which is in accordance with the D.C. voltage set on the dimmer control. A.C. from the power line is fed through the solid state relay when this relay is being actuated to a rectifier and filter circuit which converts the A.C. to D.C. and appropriately filters the rectified D.C., this D.C. voltage being fed to the lamps being controlled. Negative feedback is provided from the output of the rectifier and filter circuit to a feedback amplifier to the voltage regulator and controller to regulate the D.C. provided to the lamps.

4 Claims, 4 Drawing Figures

REGULATED LIGHT DIMMER CONTROL

This invention relates to a regulated light dimmer control system and more particularly, to such a system suitable for controlling the level of illumination of lamps in an environment where sound recording is required.

A particular problem is presented in lighting control on sound stages such as employed in motion picture, television and theater work in view of the fact that audio interference is generated by high power A.C. and therefore such A.C. must generally be isolated from the sound equipment. This problem is generally alleviated by feeding only D.C. into the sound stage area, keeping whatever A.C. power lines are needed to develop this D.C. out of pickup range of the sound equipment. The system of the present invention is an improvement over prior art dimming control systems employed in an environment where sound recording is required.

The control system of the present invention obviates shortcomings of the prior art in providing a controlled circuit which uses a timing control operation which operates to energize the power circuits during only a portion of the A.C. cycle, the duration of the energized period being in accordance with a D.C. voltage set on a dimmer control. With such intermittent excitation over only a portion of the A.C. cycle, only the power needed to energize the lamps is drawn from the power source such dissipation of such energy is substantially lessened as compared with systems of the prior art.

In achieving the desired end results in the system of the present invention, a D.C. output set on a dimmer control by the operator is compared with a timing signal having a periodic wave form in a voltage comparator circuit such that when the periodic timing signal is at a point of equality with the D.C. signal, a control signal is generated to "fire" a solid state relay. Alternating current from the A.C. power line is fed through the solid state relay to a rectifier and filter circuit and thence to the controlled lamps. Negative feedback is provided from the output of the rectifier and filter to control the D.C. output so as to limit the voltage fed to the lamps at a preset value.

It is therefore an object of this invention to provide an improved dimmer control system suitable for use in controlling the illumination on a sound stage or the like.

It is a further object of this invention to provide a dimmer control for controlling lighting in which the dissipation of the available power is minimized.

It is still a further object of this invention to provide an improved dimmer control for controlling lighting in motion picture and television studios and the like, having a regulated D.C. output.

Other objects of the invention will become apparent as the description proceeds in connection with the accompanying drawings of which:

Figure 1:
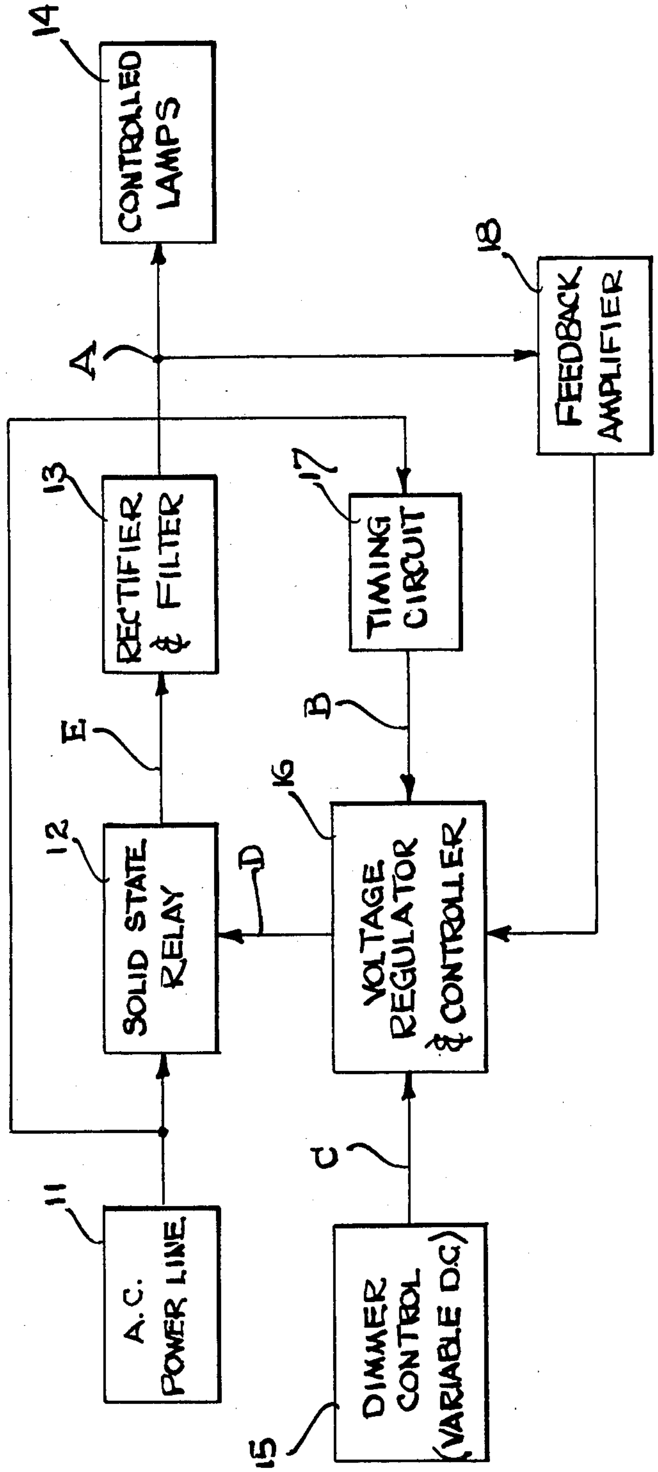
FIG. 1 is a functional block diagram of the invention.

Referring now to FIG. 1, a functional block diagram of the invention is shown. A.C. from power line 11 is fed to solid state relay 12 which is a commercially available device generally including a silicon controlled rectifier or Triac. The solid state relay 12 is keyed by a voltage regulator and controller 16 which supplies a keying or firing signal in response to signals from dimmer control 15 and timing circuit 17. Dimmer control 15 typically is a manually adjustable potentiometer which provides a D.C. output voltage at "C" in accordance with the setting of the potentiometer. Timing circuit 17 provides a periodic timing signal which is typically a periodic D.C. waveform synchronized with A.C. power line 11. When the varying output of timing circuit 17 arrives at a value which is at parity or equality with an output responsive to dimmer control 15 (as presented at a comparator within voltage regulator and controller 16), a firing voltage "D" is provided to fire solid state relay 12. During the time interval that the solid state relay 12 is in its fired or activated state, A.C. power is passed from the power line 11 to rectifier and filter 13 where the A.C. is rectified and filtered and finally fed to the controlled lamps 14 which are illuminated in accordance with the D.C. output of rectifier and filter 13. The intensity of this illumination is dependent on the setting of dimmer control 15 which, in turn, determines the portion of the A.C. cycle during which solid state relay 12 will be energized and thus the output voltage "E" (See FIGS. 3A AND 3B) fed from solid state relay 12 to rectifier and filter 13.

A negative feedback voltage is fed from point "A" through feedback amplifier 18 to voltage regulator and controller 16 to limit the output voltage to a preset value. Thus, if the output voltage should go above the desired value, the negative feedback signal will operate to control solid state relay to lower the output voltage. The feedback signal operates to limit the output voltage.

Figure 2:
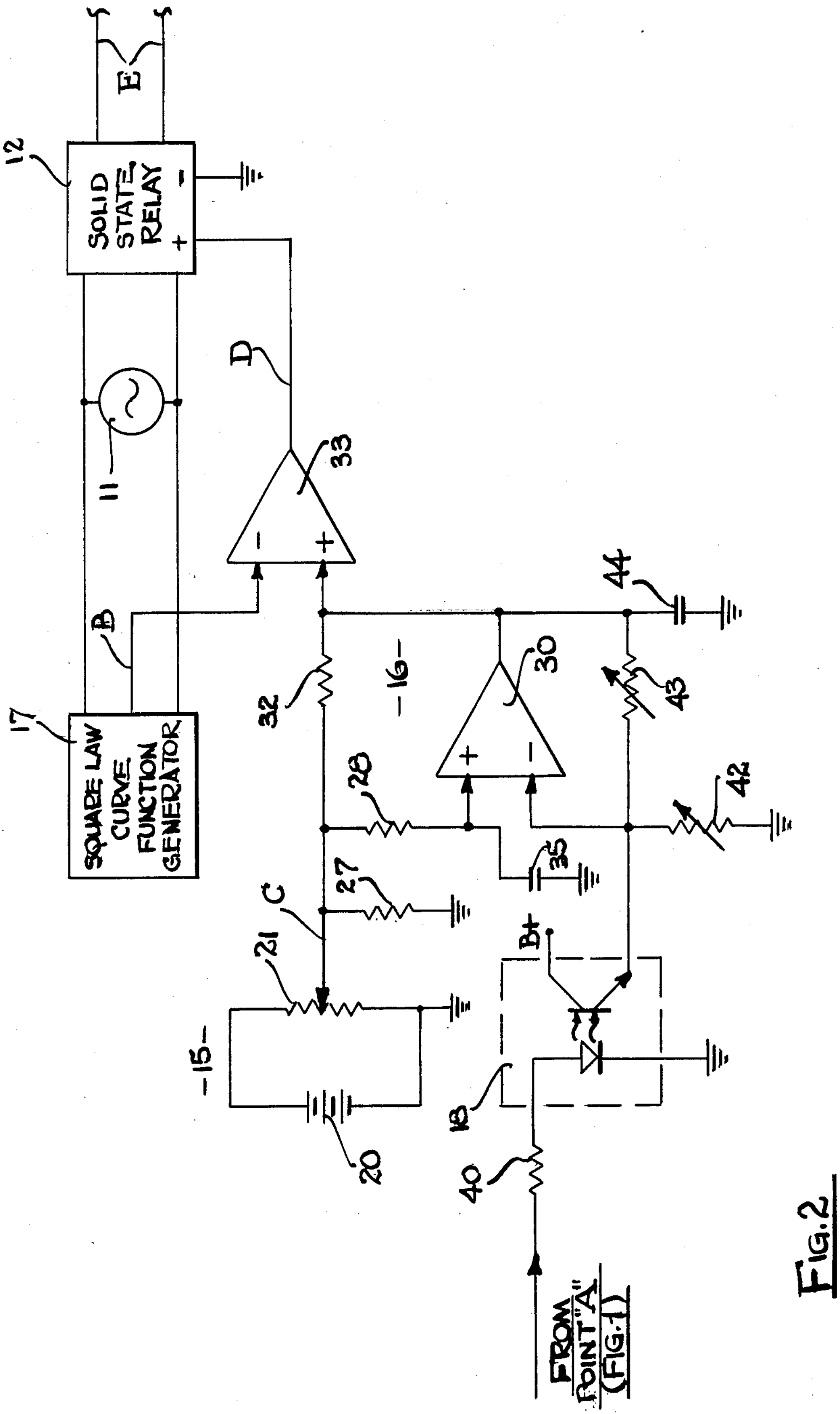
FIG. 2 is a schematic drawing showing a preferred embodiment of the regulator and controller circuits of the invention.

Referring now to FIG. 2, a schematic drawing of a preferred embodiment of the control and regulator circuitry of the invention is illustrated. Dimmer control 15 comprises a D.C. power source 20 and a potentiometer 21, the potentiometer being controlled by an operator to provide a predetermined D.C. output at point "C" which corresponds to a particular illumination level for controlled lamps 14. The D.C. control output at point "C" typically may be made variable between 0 and 10 volts. The D.C. voltage at point "C" is fed across resistor 27 and through resistor 28 to the positive input of voltage comparator 30 and through resistor 32 to the positive input of voltage comparator 33. Voltage comparators 30 and 33 may comprise operational amplifiers having positive and negative input terminals for producing an output in accordance with the differential between their inputs. Capacitors 35 and 44 are provided to filter out any spurious signals or transients that might appear.

A negative feedback signal is fed from point "A" (FIG. 1) to optoisolator 18, this signal representing the voltage fed to controlled lamps 14. Optoisolators are integrated circuits which incorporate an LED and a phototransistor and in this instance, this device is employed to isolate the approximately 120 volt D.C. output at point "A" from the transistor amplifier circuit. The voltage from point "A" is fed through input resistor 40 to the light emitting diode (LED) of photoisolator 18 which, in turn, provides an optical signal to the phototransistor, this signal being in accordance with the voltage of the input signal. The output of photoisolator 18 is fed to the negative input of operational amplifier 30. Variable resistors 42 and 43, which are also connected to the output of optoisolator 18, form a voltage divider network by means of which the desired maximum output voltage at point "A" can be set, thus, in effect, biasing the output of the optoisolator. Thus, it can be seen that if the voltage at Point "A" should rise above the desired value, a negative feedback signal is provided as a negative input to differential amplifier 30 which, in turn, will tend to lower the output of the amplifier. This will, in effect, lower the positive input to differential amplifier 33, modifying the output at "C" accordingly. In this manner, the D.C. output fed to controlled lamps 14 tends to be limited to the present value.

Figure 3A:
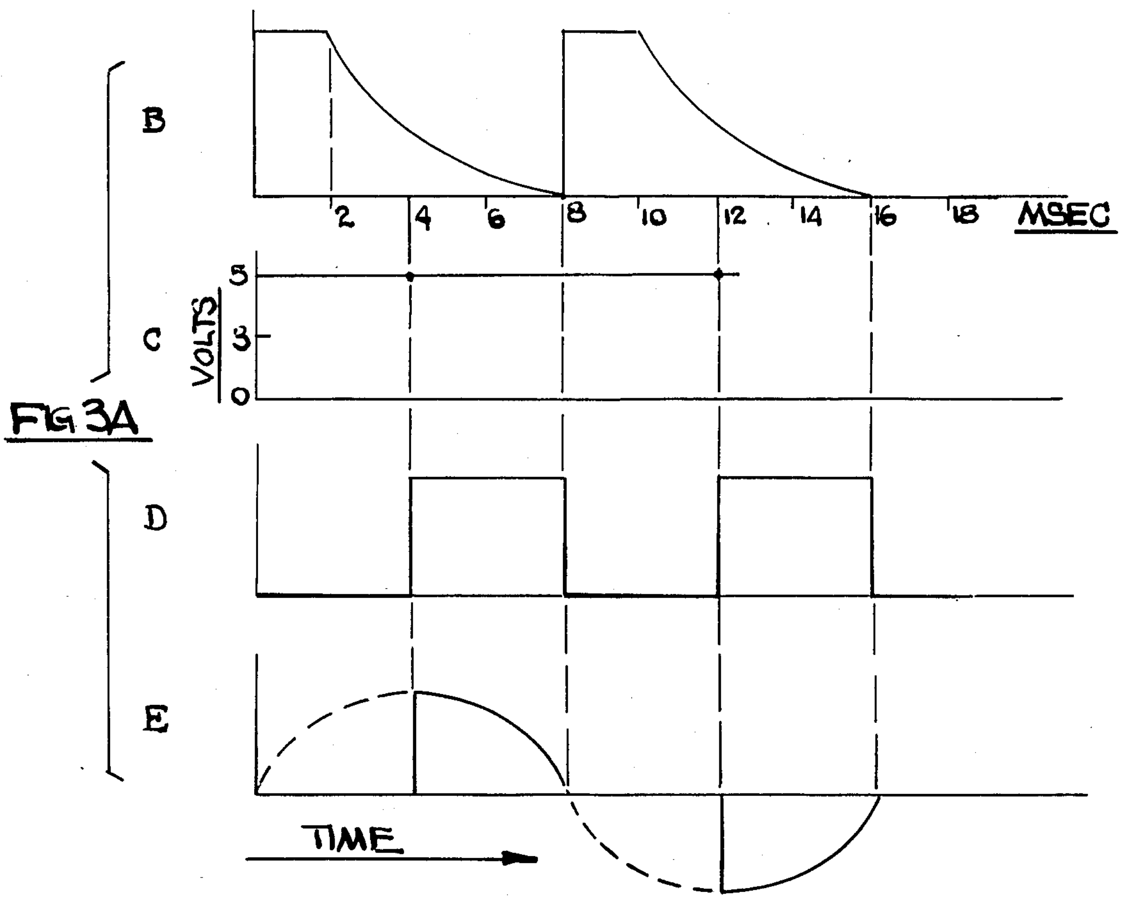
FIGS. 3A and 3B are a series of waveform diagrams illustrating the operation of the preferred embodiment.
Figure 3B:
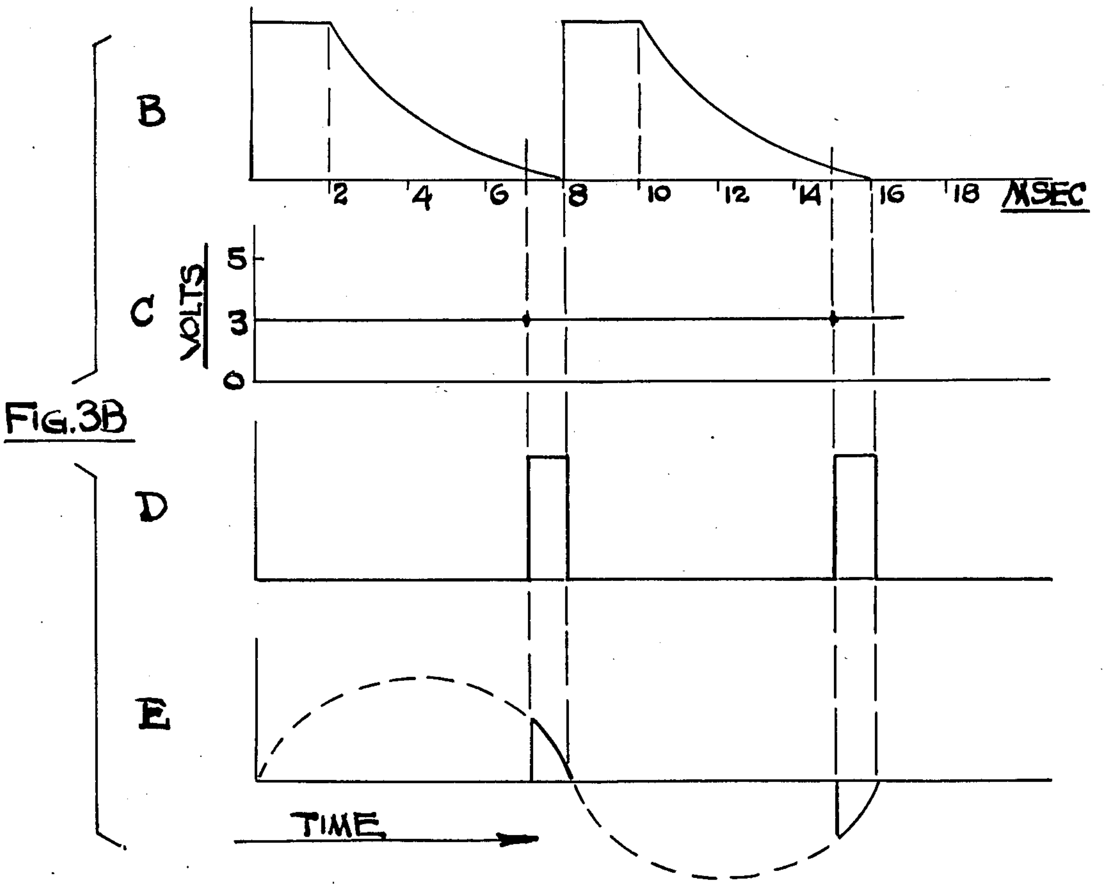

The output of square law curve function generator 17 which is shown on line "B" in FIGS. 3A and 3B is fed as a negative input to differential amplifier 33. The square law curve is typically used in lighting control and function generators for providing this output are commercially available. The square law function generator is synchronized with A.C. power line 11.

The operation will now be described in connection with FIGS. 3A and 3B which are a series of time related wave forms showing the voltages at the various points "B", "C", "D" and "E" in FIGS. 1 and 2. FIG. 3A shows the waveforms where the D.C. voltage at Point "C" is 5 volts, while FIG. 3B shows the waveforms where the D.C. voltage at point "C" is 3 volts.

Referring first to FIG. 3A, when the voltage "B" fed to the negative input of amplifier 33 from the square law curve function generator 17 reaches parity with the voltage fed to the positive input of amplifier 33 (the voltage "C" minus any voltage drop across resistor 32) amplifier 33 generates an output "D" which operates to fire or activate solid state relay 12. The output signal "D" remains until the square law function generator output "B" arises to its peak value (at the 8 milisecond point). This provides an A.C. output "E" between the 4 and 6 miliseconds points and the 12 and the 15 milisecond points of the A.C. period, providing a D.C. output at point "A" which is in accordance with this pulsed output. On the other hand, when the dimmer control output "C" is set to three volts as shown in FIG. 3B, the output of the solid state relay at point "E" will only occur during the 7–8 and 15–16 milisecond portions of the A.C. period providing a correspondingly lower D.C. output at point "A" for the controlled lamps.

While the invention has been described and illustrated in detail, it is to be clearly understood that this is intended by way of illustration and example only, and is not to be taken by way of limitation, the spirit and scope of the invention being limited only by the terms of the following claims:

I claim:

1. A light dimmer circuit for controlling the level of illumination of lamps comprising:
- an A.C. power source;
- dimmer control means for providing a preselected D.C. output;
- timing circuit means for providing a periodic D.C. waveform, the A.C. power source being connected to said timing circuit means to synchronize said periodic waveform with said power source;
- rectifier and filter means for rectifying A.C. from said power source to D.C. and filtering the rectified D.C.;
- means for providing a negative D.C. feedback signal from the output of said rectifier and filter means to limit the output of said rectifier and filter means;
- a differential amplifier for receiving said negative D.C. feedback signal and a signal in accordance with the preselected D.C. output of said dimmer control means and providing a D.C. output signal in accordance with the difference therebetween;
- solid state relay means interposed between the A.C. power source and said rectifier and filter means for connecting said A.C. power source to said rectifier and filter means; and
- voltage controller means for firing said solid state relay means in accordance with the voltage output of said dimmer control means, said voltage controller means comprising a voltage comparator connected to receive the D.C. output of said dimmer control means, the D.C. output of said differential amplifier, and the D.C. periodic waveform output of said timing circuit means and operating to fire said solid state relay and maintain said relay activated only during periods when said D.C. outputs provide a signal having an amplitude equal to or greater than that of said waveform output;
- the rectifier and filter means being connected to said lamps to provide D.C. thereto in accordance with the duration of the period during which the solid state relay is fired which is a function of the D.C. output of said dimmer control means.

2. The light dimmer circuit of claim 1 wherein the timing circuit means comprises a square law curve function generator.

3. The light dimmer circuit of claim 1 wherein said dimmer control means comprises a D.C. power source and a potentiometer connected across said D.C. power source.

4. In a light dimmer circuit for controlling the level of illumination of one or more lamps, said circuit including an A.C. power source and rectifier and filter means for converting A.C. to D.C. and providing the D.C. to said lamps, the improvement comprising:
- a solid state relay;
- a dimmer control for providing a preselected D.C. output in accordance with desired levels of illumination;
- a timing circuit for providing a periodic D.C. waveform in accordance with a square law curve, said timing circuit being synchronized with the A.C. power source;
- voltage comparator means for comparing the D.C. output of the dimmer control with the D.C. waveform output of said timing circuit for generating a control signal for firing said solid state relay and maintaining said relay activated only whenever the voltage output of said dimmer control is equal to or greater than the voltage of said periodic D.C. wavefoam;
- said solid state relay being connected between said A.C. power source and said rectifier and filter means and operating to periodically feed A.C. from said power source to said rectifier and filter means in accordance with the D.C. output of the dimmer control.

* * * * *